Aug. 16, 1949.                    G. A. BRYANT                    2,479,467
                              FOLDING HAND TRUCK
Filed Dec. 3, 1947                                        2 Sheets-Sheet 1
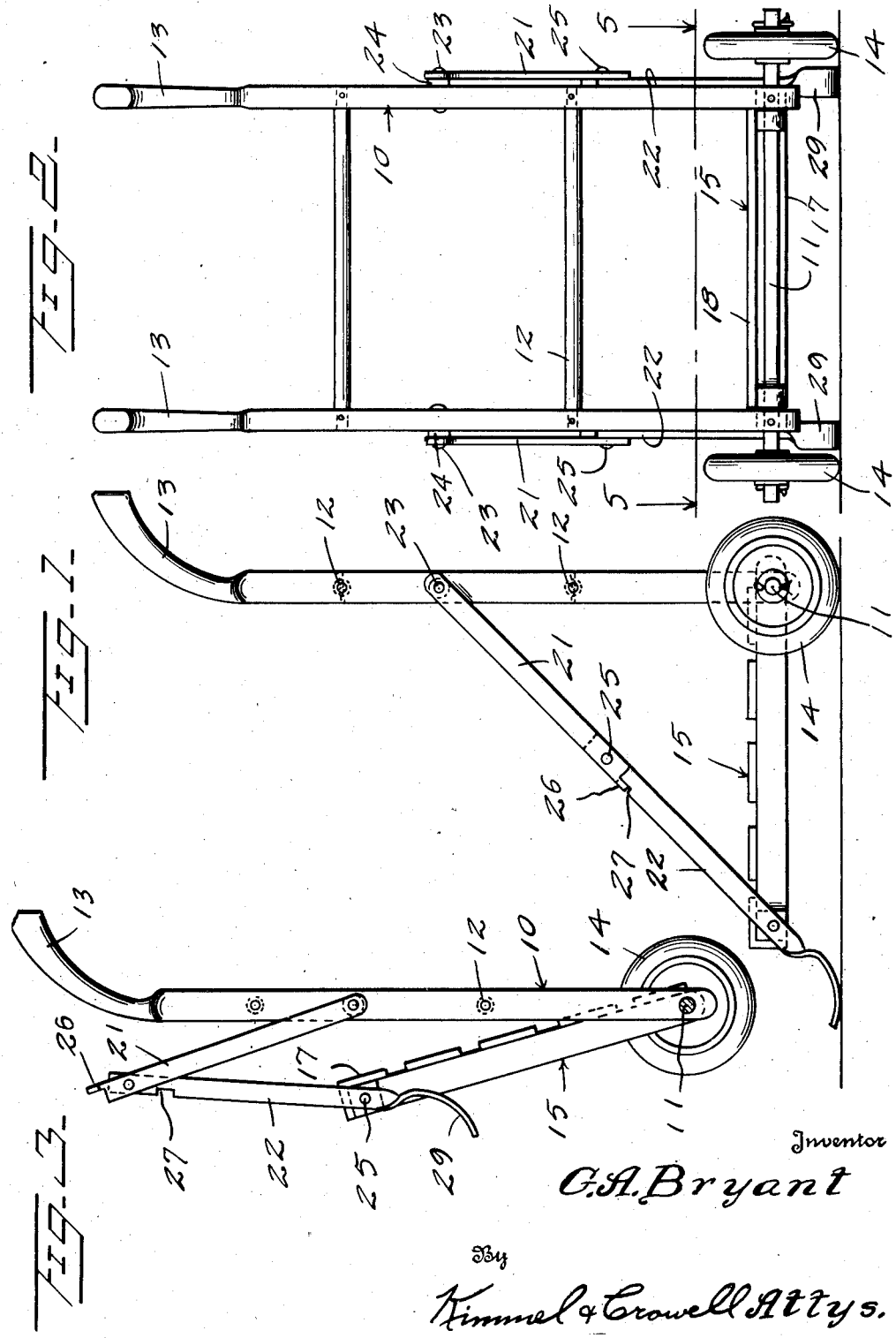
Inventor
G. A. Bryant
By
Kimmel & Crowell Attys.

Aug. 16, 1949.  G. A. BRYANT  2,479,467
FOLDING HAND TRUCK
Filed Dec. 3, 1947  2 Sheets-Sheet 2
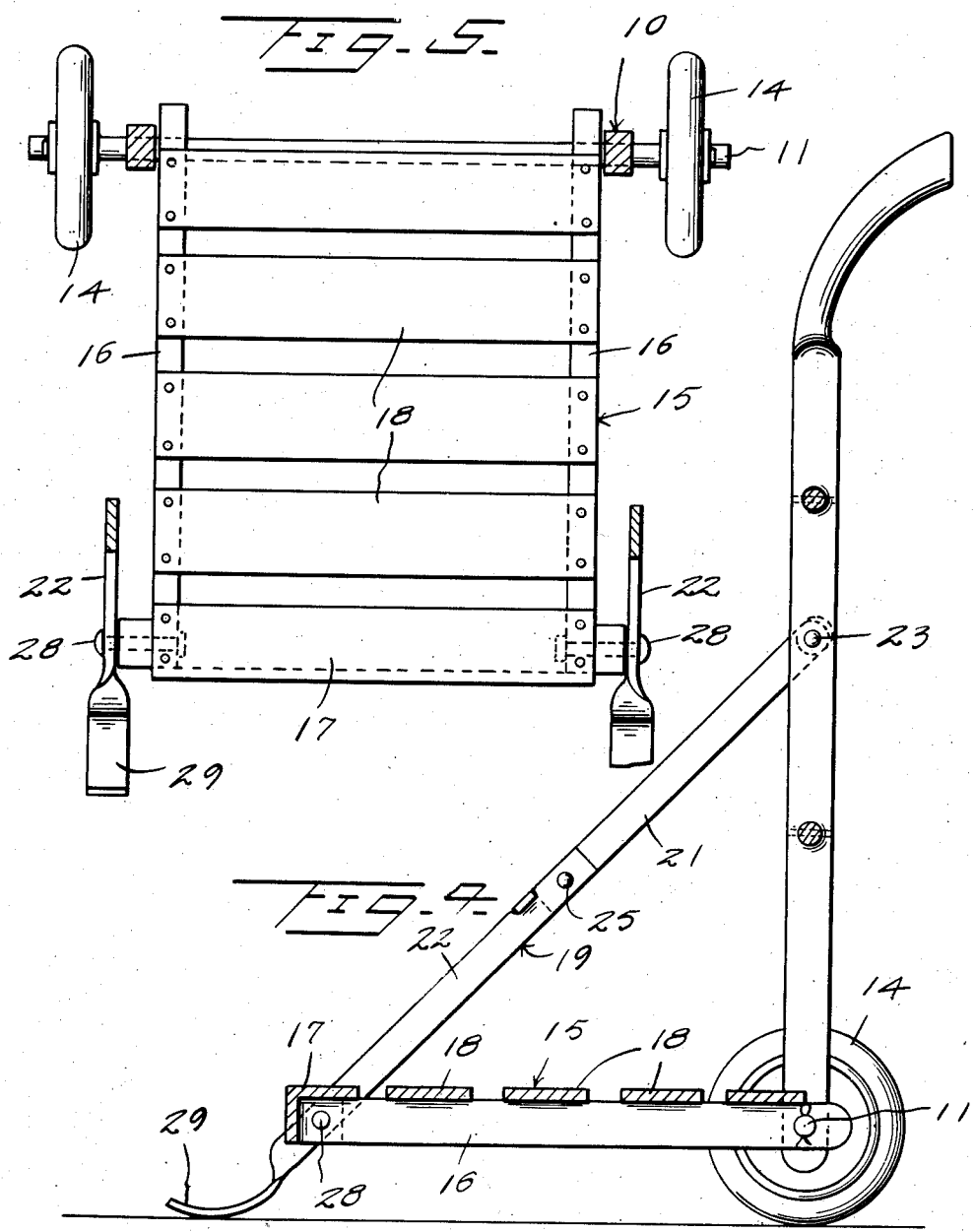

Patented Aug. 16, 1949

2,479,467

UNITED STATES PATENT OFFICE 2,479,467

FOLDING HAND TRUCK

George A. Bryant, Greensboro, N. C.

Application December 3, 1947, Serial No. 789,435

3 Claims. (Cl. 280—36)

This invention relates to hand trucks.

An object of this invention is to provide a hand truck which includes a collapsible platform so that the truck can be stored away in a small space when not in use, and when the platform is extended various articles, containers or the like may be moved about.

Another object of this invention is to provide a hand truck which is of simple construction and includes a pivoted platform which is held in operative position by means of a pair of links which are locked in extended and aligned position, and the forward link having an extension forming a foot for supporting the platform in horizontal position.

With the above and other objects in view, my invention consists in the arrangement, combination and details of construction disclosed in the drawing and specification, and then more particularly pointed out in the appended claims.

In the drawings,

Figure 1 is a detail side elevation of a hand truck constructed according to an embodiment of this invention, Figure 2 is a detail rear elevation of the device, Figure 3 is a detail side elevation, partly broken away, of the device in partly collapsed position, Figure 4 is a vertical section taken through the device, Figure 5 is a fragmentary sectional view taken on the line 5—5 of Figure 2.

Figure 6 is a fragmentary detail section showing the pivot between the links and stop lug limiting the movement of said links.

Referring to the drawings, the numeral 10 designates generally a pair of elongated side bars which are mounted at their lower ends on a shaft 11. The side bars 10 are connected together by means of at least a pair of connecting bars 12, and the upper ends of the side bars 10 terminate in rearwardly curved handles 13.

The shaft 11 has mounted thereon a pair of wheels 14 and the shaft 11 also has rockably mounted thereon a platform structure generally designated as 15. The platform structure 15 includes a pair of side bars 16 which are pivoted at their rear ends on the shaft or axle 11, and the forward ends of the side bars 16 are connected together by means of an angle bar 17.

A plurality of spaced boards or plates 18 are secured to the upper edges of the side bars 16 and form an open surface on which articles are adapted to be positioned. The platform 15 is adapted to be held in extended operative position at substantially right angles to the length of the side bars 10 by means of a pair of extensible bracing members 19 which are formed of connecting links 21 and 22.

The link 21 is an upper link and is pivotally mounted as at 23 on the outer side of a side bar 10, and preferably a spacer sleeve 24 is interposed between the link 21 and the outer side of the side bar 10. The two links 21 and 22 are pivotally connected together as at 25 and these links are adapted to be held in aligned position by means of a stop lug 26 which is formed on the link 21 and is adapted to engage in a notch 27 formed in the upper edge of the link 22.

The link 22 is pivotally secured as at 28 to the forward end portion of the side bar 16 of the platform, and the link 22 is then extended and twisted at right angles so as to form a supporting foot 29 which projects below the side bars 16. In this manner the platform 15 may be maintained in a horizontal position with the side bars 10 upright so that the desired articles may be placed on the platform 15.

The platform 15 may be swung upwardly and rearwardly to collapsed position by swinging the links 21 and 22 upwardly and outwardly, thereby raising the platform 15.

This truck may be made out of either wood, or metal or partly of wood and metal and will provide a convenient carrier for containers or other articles.

I do not mean to confine myself to the exact details of construction herein disclosed, but claim all variations falling within the purview of the appended claims.

What I claim is:

1. A hand truck comprising a pair of parallel side bars, connecting bars connecting said side bars together, an axle carried by said side bars, wheels rotatably carried by said axle, a platform pivotally carried by said axle, collapsible links connected between said side bars and said platform whereby the latter may be swung from a right angular operative position with respect to said side bars to a collapsed position closely adjacent the forward sides of said side bars, and upwardly concave supporting feet carried by certain ones of said links for supporting the outer end of said platform when in extended horizontal position.

2. A folding hand truck comprising a pair of parallel side bars, horizontal bars connecting said side bars, an axle fixed at one end of said side bars, wheels on said axle, a platform pivotally mounted on said axle, folding links pivotally connected between said side bars and said platform, said links extending beyond the connection to said platform and terminating in upwardly concave feet for supporting the forward end of said truck.

3. A folding hand truck comprising a rear frame, a platform pivotally connected to the lower end of said frame, wheels on the lower end of said frame, pivotally connected links between said frame and the outer end of said platform for supporting said platform in forwardly extending position on said frame, the lower of said links extending beyond the pivot connection to said platform and being upturned forming supporting feet for the forward end of said platform.

GEO. A. BRYANT.

REFERENCES CITED

The following references are of record in the file of this patent:

UNITED STATES PATENTS

| Number | Name | Date |
|---|---|---|
| 1,718,962 | Kimball | July 2, 1929 |
| 2,405,674 | Schliwa et al. | Aug. 13, 1946 |